(12) United States Patent
Nakagawa et al.

(10) Patent No.: US 12,233,751 B2
(45) Date of Patent: Feb. 25, 2025

(54) PROPULSION CONTROL DEVICE AND PROPULSION CONTROL METHOD

(71) Applicant: Mitsubishi Electric Corporation, Tokyo (JP)

(72) Inventors: Ayano Nakagawa, Tokyo (JP); Yoshinori Yamashita, Tokyo (JP); Yoshinori Chiba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/769,359

(22) PCT Filed: Nov. 26, 2019

(86) PCT No.: PCT/JP2019/046111
§ 371 (c)(1),
(2) Date: Apr. 15, 2022

(87) PCT Pub. No.: WO2021/106063
PCT Pub. Date: Jun. 3, 2021

(65) Prior Publication Data
US 2024/0140205 A1    May 2, 2024

(51) Int. Cl.
*B60L 15/20* (2006.01)
*B60L 7/22* (2006.01)

(52) U.S. Cl.
CPC .............. *B60L 7/22* (2013.01); *B60L 2200/26* (2013.01)

(58) Field of Classification Search
CPC ...................................... B60L 7/22; B60L 7/12
See application file for complete search history.

(56) References Cited

U.S. PATENT DOCUMENTS

2017/0232847 A1*  8/2017  Fujiwara ................... B60L 9/04
                                                  318/380
2021/0075342 A1*  3/2021  Horiuchi ................... B60L 9/16

FOREIGN PATENT DOCUMENTS

| JP | 2004312939 A | 11/2004 |
|----|---|---|
| JP | 2018126039 A | 8/2018 |
| JP | 2019009907 A | 1/2019 |

OTHER PUBLICATIONS

International Search Report (PCT/ISA/210) with translation and Written Opinion (PCT/ISA/237) mailed on Jan. 28, 2020, by the Japan Patent Office as the International Searching Authority for International Application No. PCT/JP2019/046111. (8 pages).

(Continued)

*Primary Examiner* — Kawing Chan
*Assistant Examiner* — Charles S Laughlin
(74) *Attorney, Agent, or Firm* — BUCHANAN, INGERSOLL & ROONEY PC

(57) ABSTRACT

A propulsion control device includes: a first wire connectable to a power line supplied with direct-current power or a ground line connected to a reference potential; a second wire connectable to the power line or the ground line; and a brake chopper circuit in which a first switching element to which a first diode is connected in parallel and a second switching element to which a second diode is connected in parallel are connected in series, and in the brake chopper circuit, one end of the first switching element is connected to the first wire, another end of the first switching element is connected to one end of the second switching element at a connection point, another end of the second switching element is connected to the second wire, and the connection point is connected to the first wire or the second wire via a brake resistor.

12 Claims, 10 Drawing Sheets

(56) References Cited

OTHER PUBLICATIONS

Notification of Reasons for Refusal with translation dated Feb. 1, 2022 issued in corresponding Japanese Patent Application No. 2021-560793 by the Japan Patent Office. (8 pages).
Office Action dated Sep. 30, 2022, issued in corresponding Indian Patent Application No. 202227029111, 5 pages.

* cited by examiner

PROPULSION CONTROL DEVICE AND PROPULSION CONTROL METHOD

FIELD

The present invention relates to a propulsion control device to be installed on a railway vehicle and a propulsion control method.

BACKGROUND

In a railway vehicle used for an electric railcar, power obtained by using regenerative braking at a time of deceleration is conventionally returned to an overhead contact line. In a system that controls the operation of a plurality of electric railcars, power returned to an overhead contact line is used by other electric railcars located nearby, and thereby it is possible to reduce power consumption in the entire system. Here, in a case where there is no other electric railcar around the electric railcar using the regenerative braking, even if the power is returned to the overhead contact line, there occurs regeneration cancellation. In order to avoid the regeneration cancellation, Patent Literature 1 discloses a technique in which, of power generated by regenerative braking, excess power that cannot be used in other electric railcars is consumed by a brake resistor included in a brake chopper circuit.

CITATION LIST

Patent Literature

Patent Literature 1: Japanese Patent Application Laid-open No. 2018-126039

SUMMARY

Technical Problem

As power supplied from an overhead contact line to an electric railcar, there are alternating-current power and direct-current power. In a case where direct-current power is supplied from an overhead contact line, a route is generally operated with a voltage of the overhead contact line having a positive polarity, but there is in some cases a route operated with a voltage of the overhead contact line having a negative polarity. In cases where the polarities of overhead contact lines are different from each other, that is, in a case where the polarity of the overhead contact line is positive and a case where the polarity of the overhead contact line is negative, potentials applied to electric railcars are opposite, and currents flow through the electric railcars in opposite directions. Therefore, a device having a circuit configuration described in Patent Literature 1 has a problem in that it is difficult to cope with both a case where a polarity of an overhead contact line is positive and a case where the polarity of the overhead contact line is negative.

The present invention has been made in view of the above, and an object thereof is to provide a propulsion control device capable of receiving supply of direct-current power from power supply lines whose voltages have different polarities.

Solution to Problem

In order to solve the above-described problems and achieve the object, a propulsion control device according to the present invention includes: a first wire connectable to a power line to which direct-current power is supplied from a power supply line or to a ground line connected to a reference potential; a second wire connectable to the power line or the ground line, the second wire being connected to the ground line in a case where the first wire is connected to the power line, and being connected to the power line in a case where the first wire is connected to the ground line; and a brake chopper circuit in which a first switching element to which a first diode that is a freewheeling diode is connected in parallel and a second switching element to which a second diode that is a freewheeling diode is connected in parallel are connected in series, wherein in the brake chopper circuit, one end of the first switching element is connected to the first wire, another end of the first switching element is connected to one end of the second switching element at a connection point, another end of the second switching element is connected to the second wire, and the connection point is connected to the first wire or the second wire via a brake resistor.

Advantageous Effects of Invention

According to the present invention, the propulsion control device achieves an effect that it is possible to receive supply of direct-current power from power supply lines whose voltages have different polarities.

DESCRIPTION OF EMBODIMENTS

Hereinafter, a propulsion control device and a propulsion control method according to each embodiment of the present invention will be described in detail with reference to the drawings. The invention is not limited to the embodiments.

First Embodiment

Figure 1:
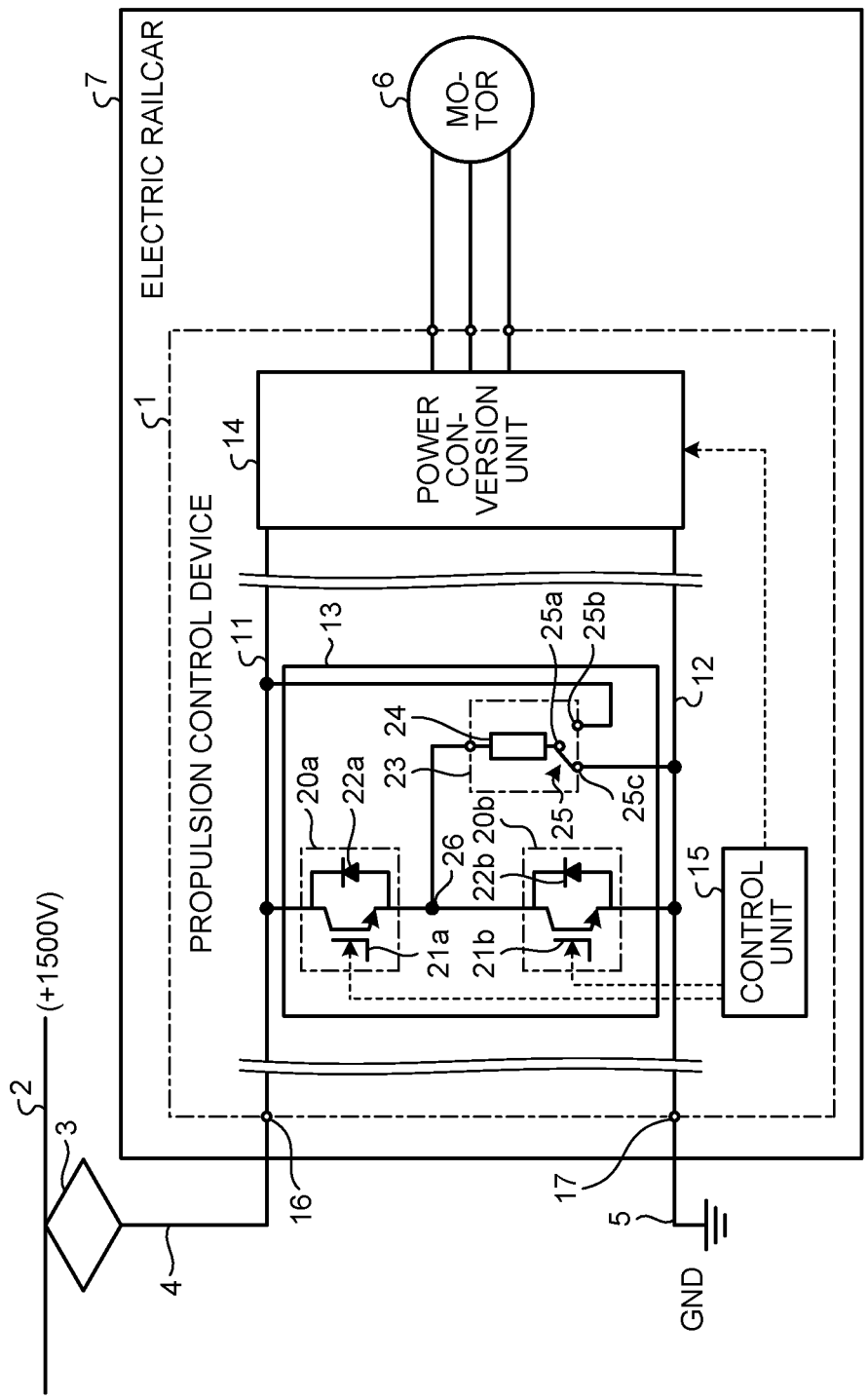
FIG. 1 is a diagram illustrating an example configuration of a propulsion control device according to a first embodiment and example connections in a case where the propulsion control device is connected to an overhead contact line that supplies direct-current power at a positive-polarity voltage.

FIG. 1 is a diagram illustrating an example configuration of a propulsion control device 1 according to a first embodiment of the present invention and example connections in a case where the propulsion control device 1 is connected to an overhead contact line 2 that supplies direct-current power at a positive-polarity voltage. FIG. 1 illustrates, by way of example, an example in which direct-current power at a voltage of +1500 V is supplied from the overhead contact line 2 to the propulsion control device 1, but the magnitude of the voltage is not limited to +1500 V. The propulsion control device 1 is a device that is installed on an electric railcar 7 and controls the speed of the electric railcar 7. The propulsion control device 1 is connected to a power line 4, a ground line 5, and a motor 6.

The power line 4 is supplied with direct-current power from the overhead contact line 2 via a pantograph 3. That is, direct-current power is supplied from the overhead contact line 2 to the propulsion control device 1 via the pantograph 3 and the power line 4. In practice, a circuit breaker or the like is provided on the power line 4 between the pantograph 3 and the propulsion control device 1, but this is a general configuration and does not affect characteristics of the present embodiment, and thus a description thereof is omitted. Note that, in FIG. 1, the overhead contact line 2 is used as a line for supplying power to the electric railcar 7, but there is no limitation thereto, and a system for supplying power to the electric railcar 7 by a third rail may be used. In the following description, the overhead contact line 2 and the third rail may be collectively referred to as a power supply line.

The ground line 5 is connected to a reference potential. In the present embodiment, the reference potential is ground. Note that, in FIG. 1, the ground is described as "GND". The same applies to the rest of the drawings.

The propulsion control device 1 converts direct-current power supplied from the power line 4 into three-phase alternating-current power, and outputs the three-phase alternating-current power to the motor 6.

The motor 6 drives wheels (not illustrated) and the like included in the electric railcar 7 by a three-phase alternating-current voltage output from the propulsion control device 1.

A configuration of the propulsion control device 1 will be described in detail. The propulsion control device 1 includes a first wire 11, a second wire 12, a brake chopper circuit 13, a power conversion unit 14, a control unit 15, a terminal 16, and a terminal 17. The brake chopper circuit 13 includes a first switching module 20a, a second switching module 20b, and a brake resistor module 23.

The first switching module 20a includes a first switching element 21a and a first diode 22a. The first diode 22a is a freewheeling diode. In the first switching module 20a, the first diode 22a is connected in parallel to the first switching element 21a. The first switching element 21a is, for example, an insulated gate bipolar transistor (IGBT). The first switching module 20a may be configured with a metal oxide semiconductor field effect transistor (MOSFET). Since the MOSFET includes a parasitic diode, the first switching module 20a may include no separate first diode 22a by using the parasitic diode of the MOSFET as the first diode 22a.

The second switching module 20b includes a second switching element 21b and a second diode 22b. The second diode 22b is a freewheeling diode. In the second switching module 20b, the second diode 22b is connected in parallel to the second switching element 21b. The second switching element 21b is, for example, an IGBT. The second switching module 20b may be configured with a MOSFET. Since the MOSFET includes a parasitic diode, the second switching module 20b may include no separate second diode 22b by using the parasitic diode of the MOSFET as the second diode 22b.

The brake resistor module 23 includes a brake resistor 24 and a switch 25. The brake resistor 24 is a resistor for consuming excessive power that cannot be used in other electric railcars located nearby (not illustrated) when power is returned to the overhead contact line 2 at a time of using regenerative braking. The brake resistor 24 may be a resistor whose resistance value is fixed, or may be a variable resistor whose resistance value is variable. In a case where the brake resistor 24 is a variable resistor, a person in charge in a railway operator operating the electric railcar 7 can easily change a resistance value of the brake resistor 24 depending on a voltage of the overhead contact line 2. Examples of the person in charge in a railway operator includes, but not limited to, a designer of the electric railcar 7, and a person in charge of maintenance of the electric railcar 7. In the following description, such a person in charge in a railway operator will be simply referred to as a "railway operator".

The switch 25 is a switch capable of changing a connection destination of the brake resistor 24. The switch 25 includes a first terminal 25a, a second terminal 25b, and a third terminal 25c. In the brake chopper circuit 13, one end of the brake resistor 24 is connected to a connection point 26, the other end of the brake resistor 24 is connected to the first terminal 25a of the switch 25, the second terminal 25b of the switch 25 is connected to the first wire 11, and the third terminal 25c of the switch 25 is connected to the second wire 12. The switch 25 sets a connection destination of the first terminal 25a to the second terminal 25b or the third terminal 25c.

In the brake chopper circuit 13, the first switching module 20a and the second switching module 20b are connected in series, that is, the first switching element 21a and the second switching element 21b are connected in series. In the brake chopper circuit 13, one end of the first switching element 21a is connected to the first wire 11, the other end of the first switching element 21a is connected to one end of the second switching element 21b at the connection point 26, and the other end of the second switching element 21*b* is connected to the second wire 12. In addition, in the brake chopper circuit 13, the connection point 26 and the first wire 11 or the second wire 12 are connected via the brake resistor module 23, that is, the brake resistor 24 and the switch 25. In the brake chopper circuit 13, the first switching element 21*a* and the second switching element 21*b* are connected in series, and therefore, a component of a 2-in-1 package including two IGBT elements can be used, for example.

As illustrated in FIG. 1, in a case where the polarity of the direct-current power is positive, in the propulsion control device 1, the power line 4 is connected to the first wire 11 via the terminal 16, the ground line 5 is connected to the second wire 12 via the terminal 17, and the first terminal 25*a* and the third terminal 25*c* are connected at the switch 25.

The control unit 15 controls operations of the brake chopper circuit 13 and the power conversion unit 14. Specifically, in the case where the polarity of the direct-current power is positive, the control unit 15 makes the second switching element 21*b* normally off, and controls a chopper operation, that is, turning on and turning off, of the first switching element 21*a*.

In a case where the polarity of the direct-current power is positive and the propulsion control device 1 is in the connection state as illustrated in FIG. 1, in the brake chopper circuit 13, the second diode 22*b* of the second switching module 20*b* becomes a freewheeling diode and the first switching element 21*a* of the first switching module 20*a* is turned on and off under the control of the control unit 15. As a result, the brake chopper circuit 13 controls a voltage of direct-current power to be output to the power conversion unit 14 and controls a voltage of direct-current power to be returned to the overhead contact line 2 when the regenerative braking is used.

The power conversion unit 14 converts the direct-current power output from the brake chopper circuit 13 into three-phase alternating-current power and outputs the three-phase alternating-current power to the motor 6 under the control of the control unit 15. When the regenerative braking is used, the power conversion unit 14 converts the three-phase alternating-current power generated by the motor 6 into direct-current power and outputs the direct-current power to the brake chopper circuit 13 under the control of the control unit 15.

Figure 2:
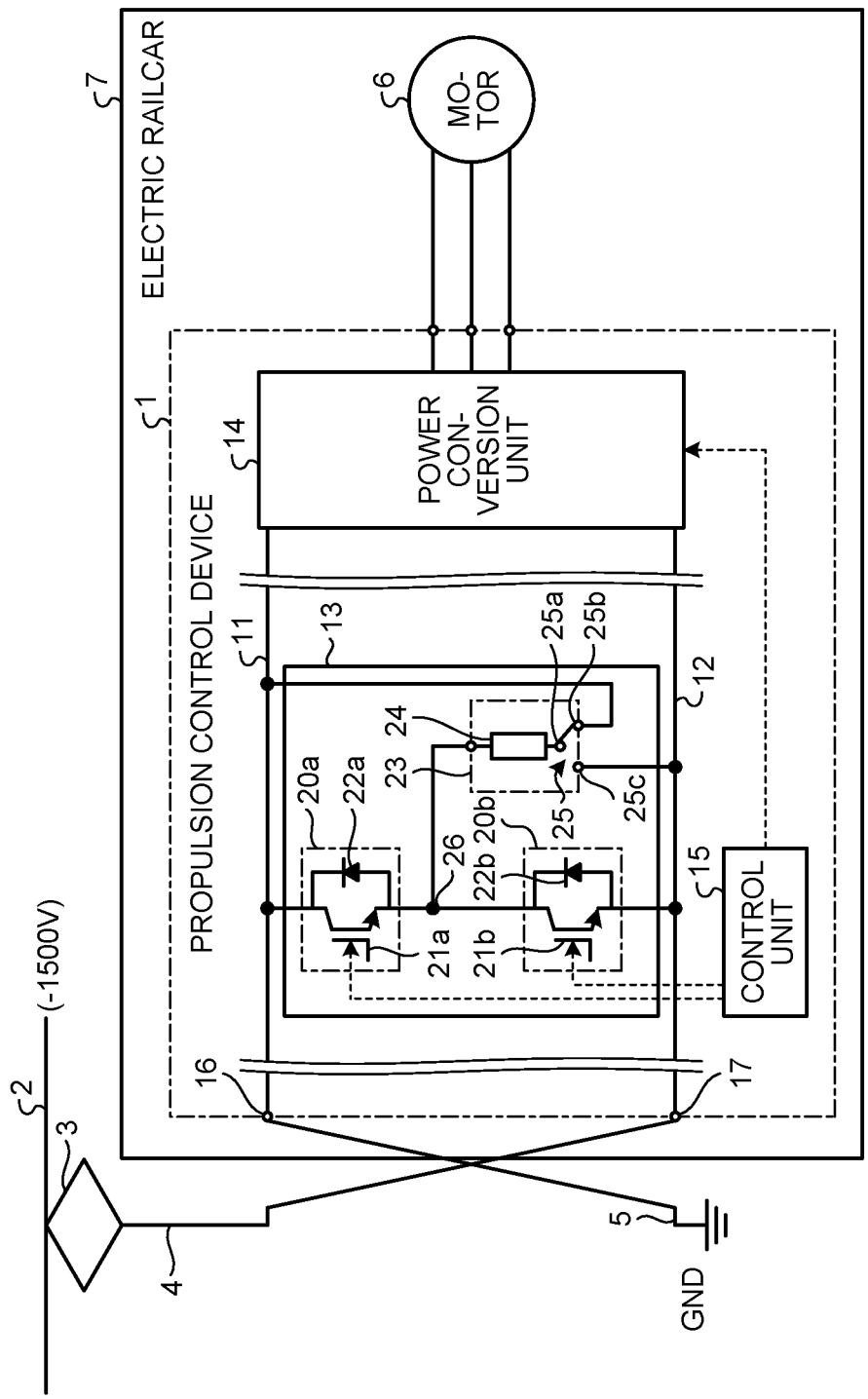
FIG. 2 is a diagram illustrating an example configuration of the propulsion control device according to the first embodiment and example connections in a case where the propulsion control device is connected to the overhead contact line that supplies direct-current power at a negative-polarity voltage.

Here, even in a case where the polarity of the direct-current power is negative, the propulsion control device 1 can be used in the electric railcar 7 by employing a connection state different from that of FIG. 1. FIG. 2 is a diagram illustrating an example configuration of the propulsion control device 1 according to the first embodiment and example connections in a case where the propulsion control device 1 is connected to the overhead contact line 2 that supplies direct-current power at a negative-polarity voltage. FIG. 2 illustrates, by way of example, an example in which direct-current power at a voltage of −1500 V is supplied from the overhead contact line 2 to the propulsion control device 1, but the magnitude of the voltage is not limited to −1500 V. The configuration of the propulsion control device 1 illustrated in FIG. 2 is similar to the configuration of the propulsion control device 1 illustrated in FIG. 1. A connection destination of the power line 4, a connection destination of the ground line 5, and a connection destination of the first terminal 25*a* at the switch 25 in the propulsion control device 1 illustrated in FIG. 2 are different from those in the propulsion control device 1 illustrated in FIG. 1.

As illustrated in FIG. 2, in the case where the polarity of the direct-current power is negative, in the propulsion control device 1, the power line 4 is connected to the second wire 12 via the terminal 17, the ground line 5 is connected to the first wire 11 via the terminal 16, and the first terminal 25*a* and the second terminal 25*b* are connected at the switch 25.

The control unit 15 controls operations of the brake chopper circuit 13 and the power conversion unit 14. Specifically, in the case where the polarity of the direct-current power is negative, the control unit 15 makes the first switching element 21*a* normally off, and controls a chopper operation, that is, turning on and turning off, of the second switching element 21*b*.

In a case where the polarity of the direct-current power is negative and the propulsion control device 1 is in the connection state as illustrated in FIG. 2, in the brake chopper circuit 13, the first diode 22*a* of the first switching module 20*a* becomes a freewheeling diode and the second switching element 21*b* of the second switching module 20*b* is turned on and off under the control of the control unit 15. As a result, the brake chopper circuit 13 controls a voltage of direct-current power to be output to the power conversion unit 14 and controls a voltage of direct-current power to be returned to the overhead contact line 2 when the regenerative braking is used.

As illustrated in FIGS. 1 and 2, the first wire 11 is connectable to the power line 4 or the ground line 5 via the terminal 16. Similarly, the second wire 12 is connectable to the power line 4 or the ground line 5 via the terminal 17. However, the first wire 11 is connected to the ground line 5 via the terminal 16 in a case where the second wire 12 is connected to the power line 4 via the terminal 17, and is connected to the power line 4 via the terminal 16 in a case where the second wire 12 is connected to the ground line 5 via the terminal 17. Similarly, the second wire 12 is connected to the ground line 5 via the terminal 17 in a case where the first wire 11 is connected to the power line 4 via the terminal 16, and is connected to the power line 4 via the terminal 17 in a case where the first wire 11 is connected to the ground line 5 via the terminal 16. The terminals 16 and 17 are, for example, connectors connectable to one of the power line 4 and the ground line 5. A portion in each of the power line 4 and the ground line 5 to be connected to the terminal 16 or the terminal 17 is also a connector having a shape corresponding to the shape of the connector of the terminal 16 or the terminal 17.

In the present embodiment, it is assumed that the polarity of the voltage of the direct-current power supplied from the overhead contact line 2 is not switched between positive and negative during the operation of the electric railcar 7. That is, the electric railcar 7 does not continuously travel from a route in which the polarity of the voltage of the direct-current power supplied from the overhead contact line 2 is positive to a route in which the polarity of the voltage of the direct-current power supplied from the overhead contact line 2 is negative. Therefore, the railway operator can switch a connection destination of the power line 4, a connection destination of the ground line 5, and a connection destination of the first terminal 25*a* of the switch 25 depending on a route in which the electric railcar 7 is operated. In addition, the railway operator inputs, to the control unit 15, information on the polarity of the voltage of the direct-current power supplied from the overhead contact line 2 or information on the connection destination of the power line 4, the connection destination of the ground line 5, and the connection destination of the first terminal 25*a* of the switch 25. As a result, the control unit 15 can make one of the first switching element 21a and the second switching element 21b normally off, and control turning on and turning off of the other thereof.

The railway operator switches the connection destination of the first terminal 25a of the switch 25 such that the other end of the brake resistor 24 is connected, via the switch 25, to a wire to which the ground line 5 is connected regardless of the polarity of the direct-current power supplied from the overhead contact line 2. That is, in a case where the polarity of the voltage of the direct-current power supplied from the overhead contact line 2 is positive, the ground line 5 is connected to the second wire 12 via the terminal 17, so that the railway operator sets the connection destination of the first terminal 25a of the switch 25 to the third terminal 25c connected to the second wire 12. In addition, in a case where the polarity of the voltage of the direct-current power supplied from the overhead contact line 2 is negative, the ground line 5 is connected to the first wire 11 via the terminal 16, so that the railway operator sets the connection destination of the first terminal 25a of the switch 25 to the second terminal 25b connected to the first wire 11. In the propulsion control device 1, the control unit 15 drives only a switching element connected to a wire having a larger absolute value of a potential, and makes a switching element connected to a wire having a smaller absolute value of the potential, that is, a wire to which the ground line 5 is connected, normally off.

As a result, the propulsion control device 1 can always connect a freewheeling diode, which is a diode connected in parallel to a normally off switching element, to the ground which is a reference potential. In addition, the propulsion control device 1 can connect the brake resistor 24 to a wire to which the ground line 5 is connected, that is, to the ground which is the reference potential not via a switching element controlled to be turned on and off. In the propulsion control device 1, if the brake resistor 24 is connected to a wire to which the power line 4 is connected, that is, the wire having a larger absolute value of the potential not via the switching element controlled to be turned on and off, an arc may occur due to insulation degradation of the brake resistor 24, a resistor failure, or the like. Therefore, in the propulsion control device 1, the brake resistor 24 is preferably connected to the wire having a smaller absolute value of the potential, that is, the ground which is the reference potential.

Figure 3:
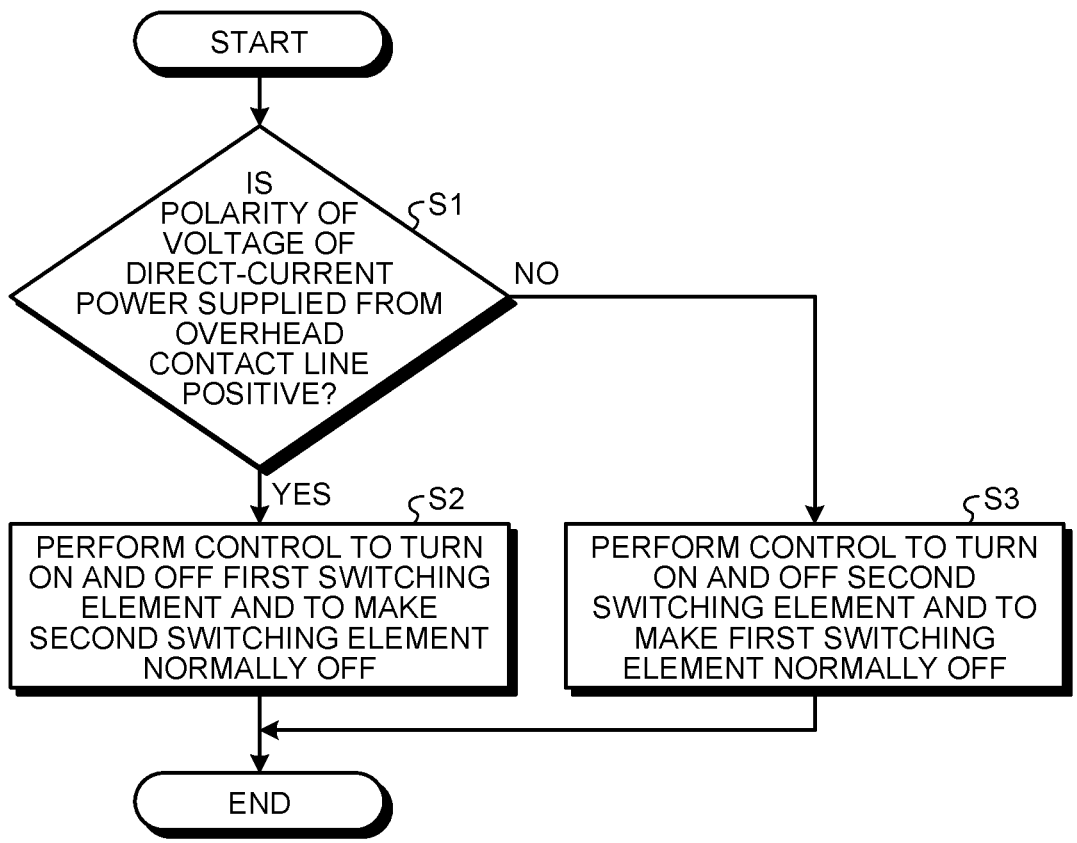
FIG. 3 is a flowchart illustrating an operation of a control unit included in the propulsion control device according to the first embodiment.

FIG. 3 is a flowchart illustrating an operation of the control unit 15 included in the propulsion control device 1 according to the first embodiment. If the polarity of the voltage of the direct-current power supplied from the overhead contact line 2 is positive on the basis of the information input by the railway operator (step S1: Yes), the control unit 15 performs control to turn on and off the first switching element 21a and to make the second switching element 21b normally off (step S2). If the polarity of the voltage of the direct-current power supplied from the overhead contact line 2 is negative on the basis of the information input by the railway operator (step S1: No), the control unit 15 performs control to turn on and off the second switching element 21b and to make the first switching element 21a normally off (step S3).

Next, a hardware configuration of the propulsion control device 1 will be described. In the propulsion control device 1, the brake chopper circuit 13 has the circuit configuration as described above. The power conversion unit 14 is a direct-current/alternating-current conversion circuit including three legs in each of which two switching elements such as MOSFETs (not illustrated) are connected in series. The control unit 15 is realized by processing circuitry. The processing circuitry may be a processor that executes a program stored in a memory and the memory, or may be dedicated hardware.

Figure 4:
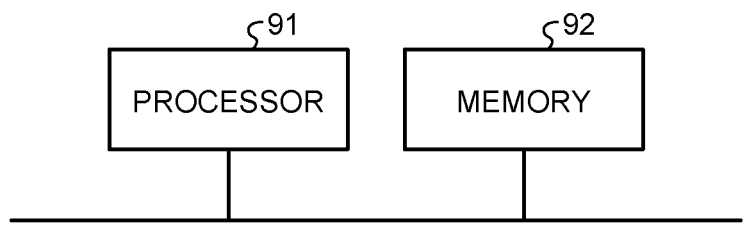
FIG. 4 is a diagram illustrating an example in which processing circuitry included in the propulsion control device according to the first embodiment is configured with a processor and a memory.

FIG. 4 is a diagram illustrating an example in which processing circuitry included in the propulsion control device 1 according to the first embodiment is configured with a processor and a memory. When the processing circuitry is configured with a processor 91 and a memory 92, functions of the processing circuitry of the propulsion control device 1 are realized by software, firmware, or a combination of software and firmware. The software or the firmware is described as a program and stored in the memory 92. In the processing circuitry, the processor 91 reads and executes the program stored in the memory 92, thereby realizing the functions. That is, the processing circuitry includes the memory 92 for storing programs with which a process of the propulsion control device 1 is executed as a result. It can also be said that these programs cause a computer to execute procedures and methods of the propulsion control device 1.

Here, the processor 91 may be a central processing unit (CPU), a processing device, an arithmetic device, a microprocessor, a microcomputer, a digital signal processor (DSP), or the like. The memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disk, or a digital versatile disc (DVD).

Figure 5:
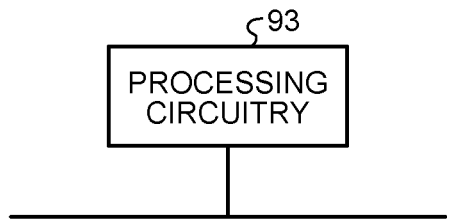
FIG. 5 is a diagram illustrating an example in which the processing circuitry included in the propulsion control device according to the first embodiment is configured with dedicated hardware.

FIG. 5 is a diagram illustrating an example in which the processing circuitry included in the propulsion control device 1 according to the first embodiment is configured with dedicated hardware. When the processing circuitry is configured with dedicated hardware, the processing circuitry 93 illustrated in FIG. 5 corresponds to, for example, a single circuit, a composite circuit, a programmed processor, a parallel programmed processor, an application specific integrated circuit (ASIC), a field programmable gate array (FPGA), or a combination thereof. Functions of the propulsion control device 1 may be separately realized by the processing circuitry 93, or the functions may be collectively realized by the processing circuitry 93.

A part of the functions of the propulsion control device 1 may be realized by dedicated hardware and another part thereof may be realized by software or firmware. Thus, the processing circuitry can realize each of the above-described functions by dedicated hardware, software, firmware, or a combination thereof.

As described above, according to the present embodiment, the propulsion control device 1 can be used in both cases where the polarity of the voltage of the direct-current power supplied from the overhead contact line 2 is positive and negative by switching the connection destinations of the power line 4 and the ground line 5 and switching the connection destination of the first terminal 25a of the switch 25 depending on the polarity of the voltage of the direct-current power supplied from the overhead contact line 2. That is, the propulsion control device 1 can receive the supply of the direct-current power from the overhead contact lines 2 whose voltages have different polarities.

Figure 6:
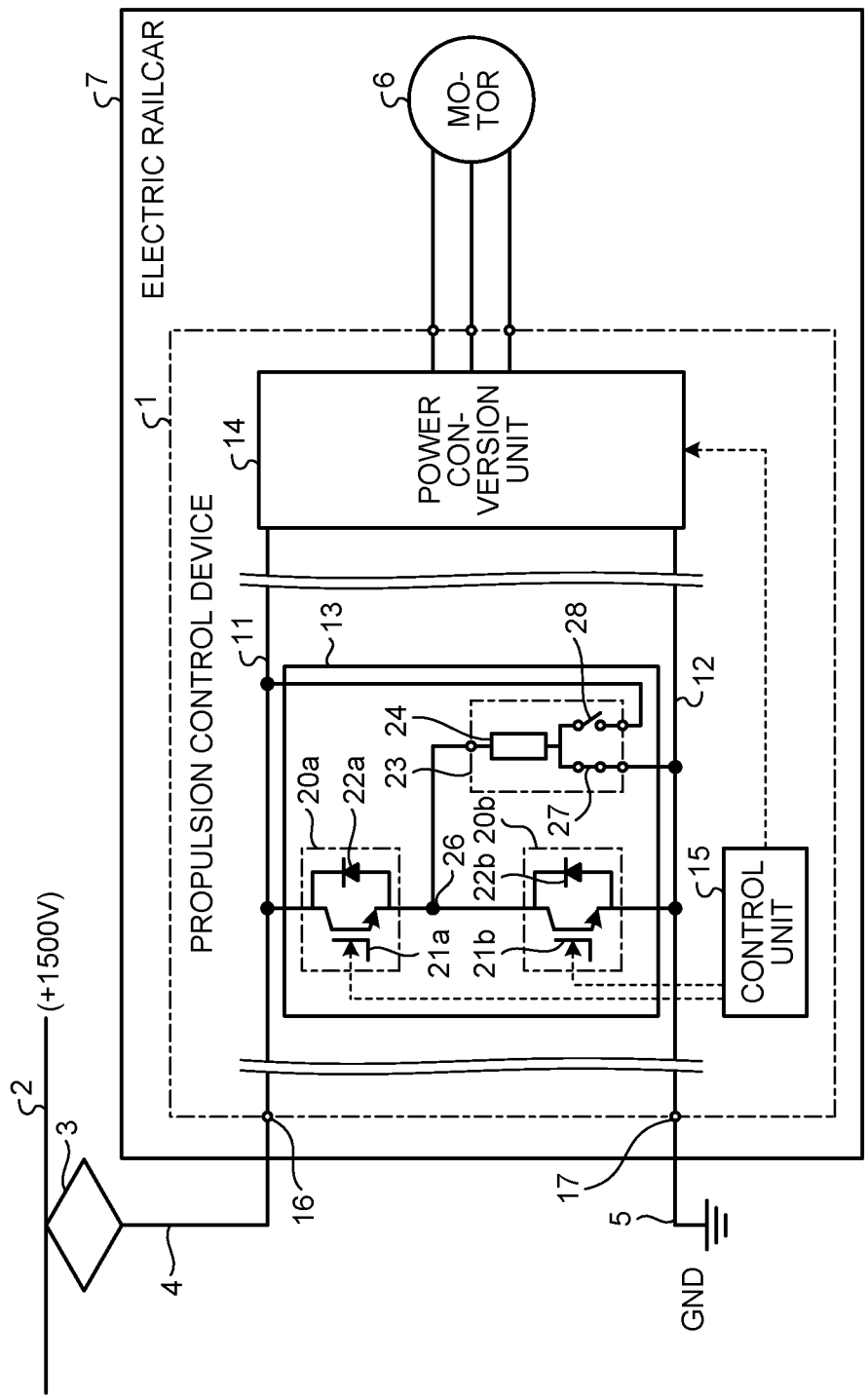
FIG. 6 is a diagram illustrating a first modification of the configuration of the propulsion control device according to the first embodiment and example connections in a case where the propulsion control device is connected to the overhead contact line that supplies direct-current power at a positive-polarity voltage.

The propulsion control device 1 may switch the connection destination of the brake resistor 24 by two switches instead of the switch 25 in the brake chopper circuit 13. FIG. 6 is a diagram illustrating a first modification of the configuration of the propulsion control device 1 according to the first embodiment and example connections in a case where the propulsion control device 1 is connected to the overhead contact line 2 that supplies direct-current power at a positive-polarity voltage. The propulsion control device 1 includes switches 27 and 28 instead of the switch 25. The railway operator turns on one of the switches 27 and 28 and turns off the other thereof depending on a route in which the electric railcar 7 is operated. FIG. 6 illustrates a case where the railway operator turns on the switch 27, turns off the switch 28, and connects the other end of the brake resistor 24 to the second wire 12. In the case where the polarity of the voltage of the direct-current power supplied from the overhead contact line 2 is negative, the railway operator turns off the switch 27, turns on the switch 28, and connects the other end of the brake resistor 24 to the first wire 11. The switches 27 and 28 may be switches that operate in conjunction with each other so that when one is turned on, the other is turned off. The propulsion control device 1 may switch the connection destination of the brake resistor 24 by three or more switches in the brake chopper circuit 13. As described above, the number of switches for switching the connection destination of the brake resistor 24 may be one, or may be two or more, that is, multiple.

Figure 7:
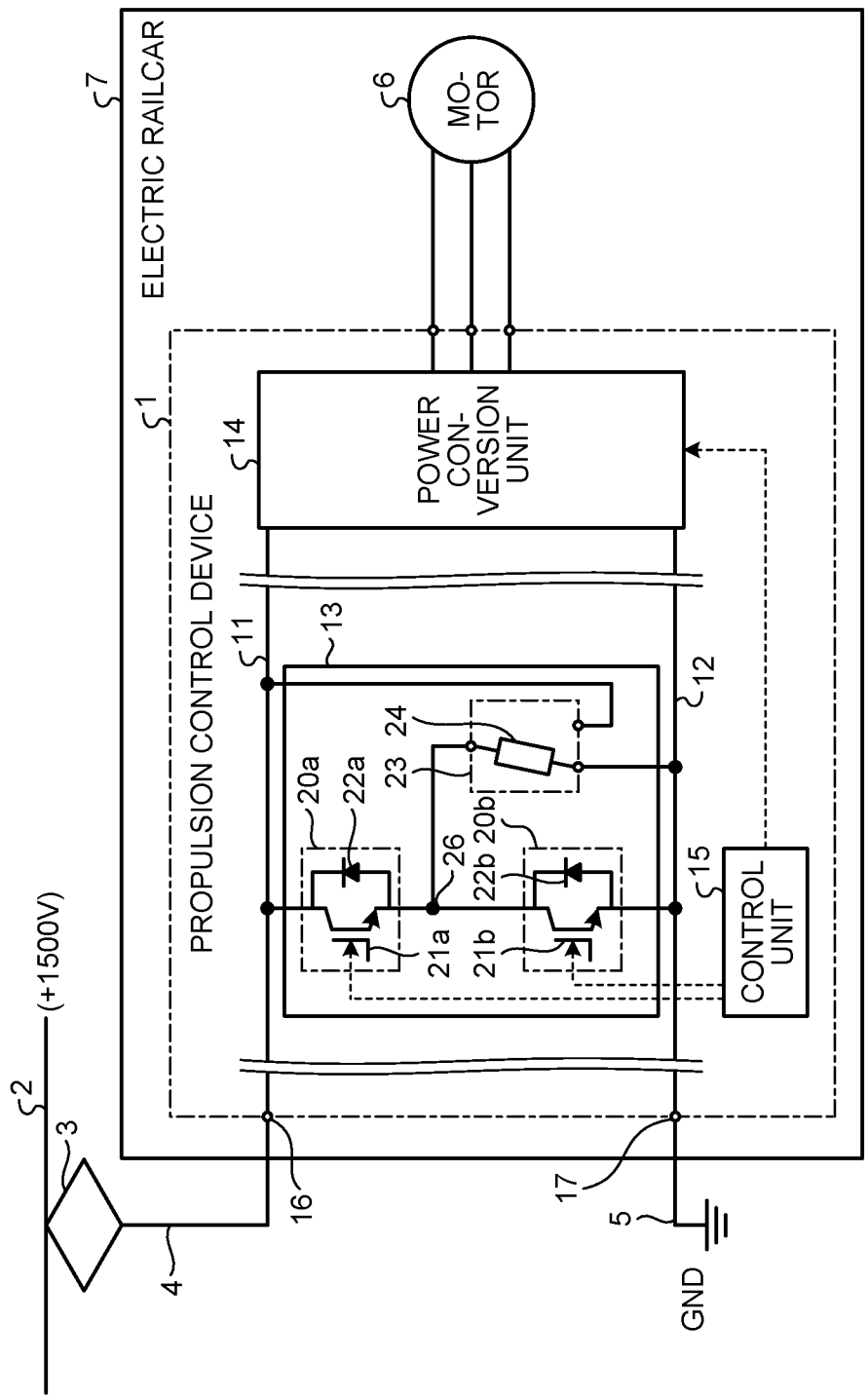
FIG. 7 is a diagram illustrating a second modification of the configuration of the propulsion control device according to the first embodiment and example connections in a case where the propulsion control device is connected to the overhead contact line that supplies direct-current power at a positive-polarity voltage.

The propulsion control device 1 may be configured such that the brake resistor 24 of the brake chopper circuit 13 can be externally attached. FIG. 7 is a diagram illustrating a second modification of the configuration of the propulsion control device 1 according to the first embodiment and example connections in a case where the propulsion control device 1 is connected to the overhead contact line 2 that supplies direct-current power at a positive-polarity voltage. With the configuration as illustrated in FIG. 7, the railway operator can change a resistance value of the brake resistor 24 for each electric railcar 7 depending on a route in which the electric railcar 7 is operated, for example, the voltage of the direct-current power supplied from the overhead contact line 2. In a case of the configuration in which the brake resistor 24 can be externally attached, the brake chopper circuit 13 can be configured such that one end of the brake resistor 24 is connected to the connection point 26 and the other end of the brake resistor 24 is directly connected to the first wire 11 or the second wire 12 without providing the switch 25. Also in that case, the railway operator operating the electric railcar 7 can easily change a resistance value of the brake resistor 24 depending on the voltage of the direct-current power supplied from the overhead contact line 2. FIG. 7 illustrates a case where the other end of the brake resistor 24 is directly connected to the second wire 12. In the case where the polarity of the voltage of the direct-current power supplied from the overhead contact line 2 is negative, the railway operator directly connects the other end of the brake resistor 24 to the first wire 11.

Second Embodiment

In the first embodiment, the railway operator switches the connection destination of the power line 4, the connection destination of the ground line 5, and the connection destination of the first terminal 25*a* of the switch 25 in the propulsion control device 1 depending on the polarity of the voltage of the direct-current power supplied from the overhead contact line 2. In addition, the railway operator inputs, to the control unit 15, information on the polarity of the voltage of the direct-current power supplied from the overhead contact line 2 or information on each of the connection destinations. In that case, there is a concern about an erroneous input, omission of input, and the like to the control unit 15 by the railway operator. In a second embodiment, a control unit determines whether each of the connection destinations is appropriate for the polarity of the voltage of the direct-current power supplied from the overhead contact line 2.

Figure 8:
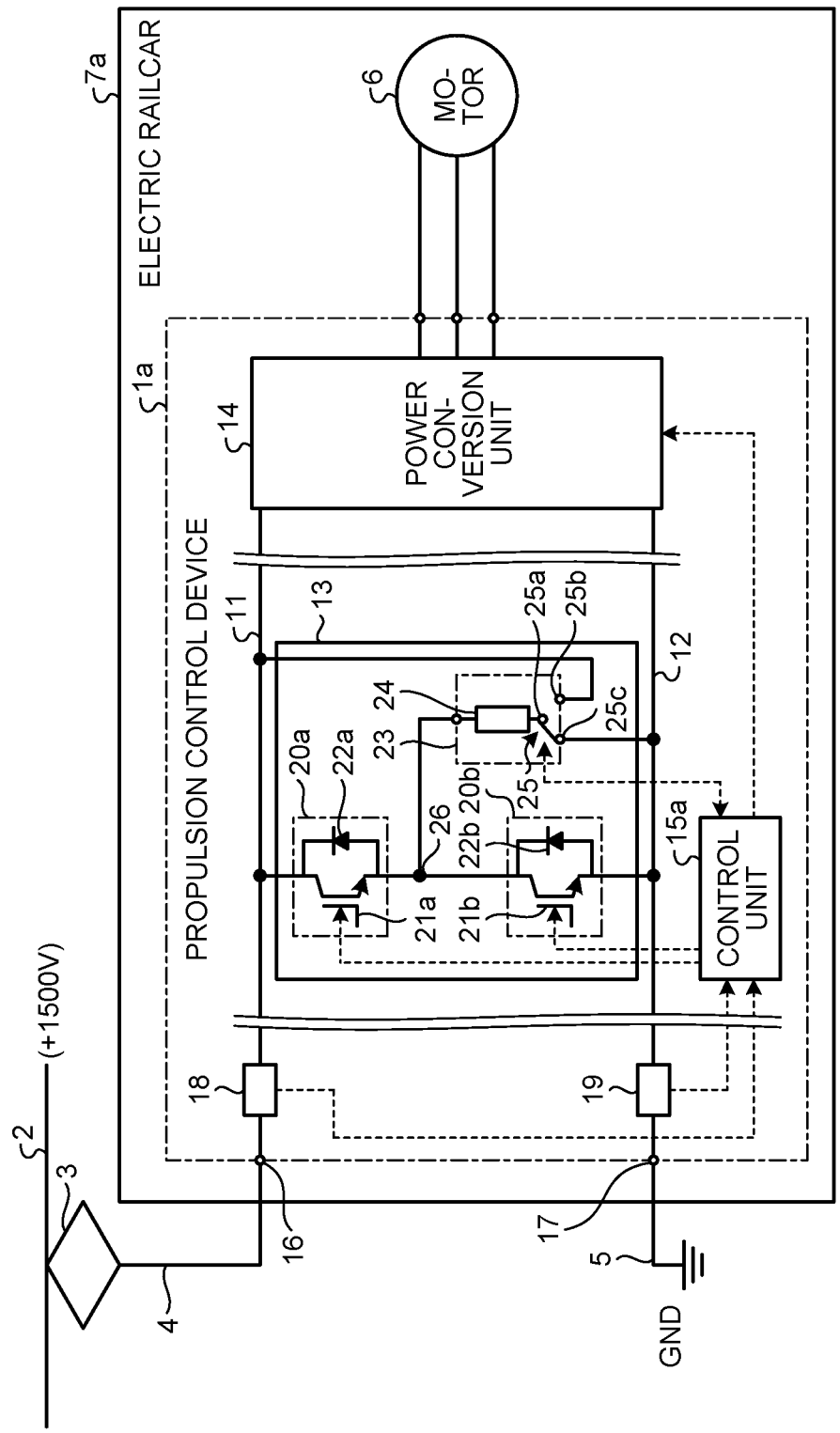
FIG. 8 is a diagram illustrating an example configuration of a propulsion control device according to a second embodiment and example connections in a case where the propulsion control device is connected to the overhead contact line that supplies direct-current power at a positive-polarity voltage.
Figure 9:
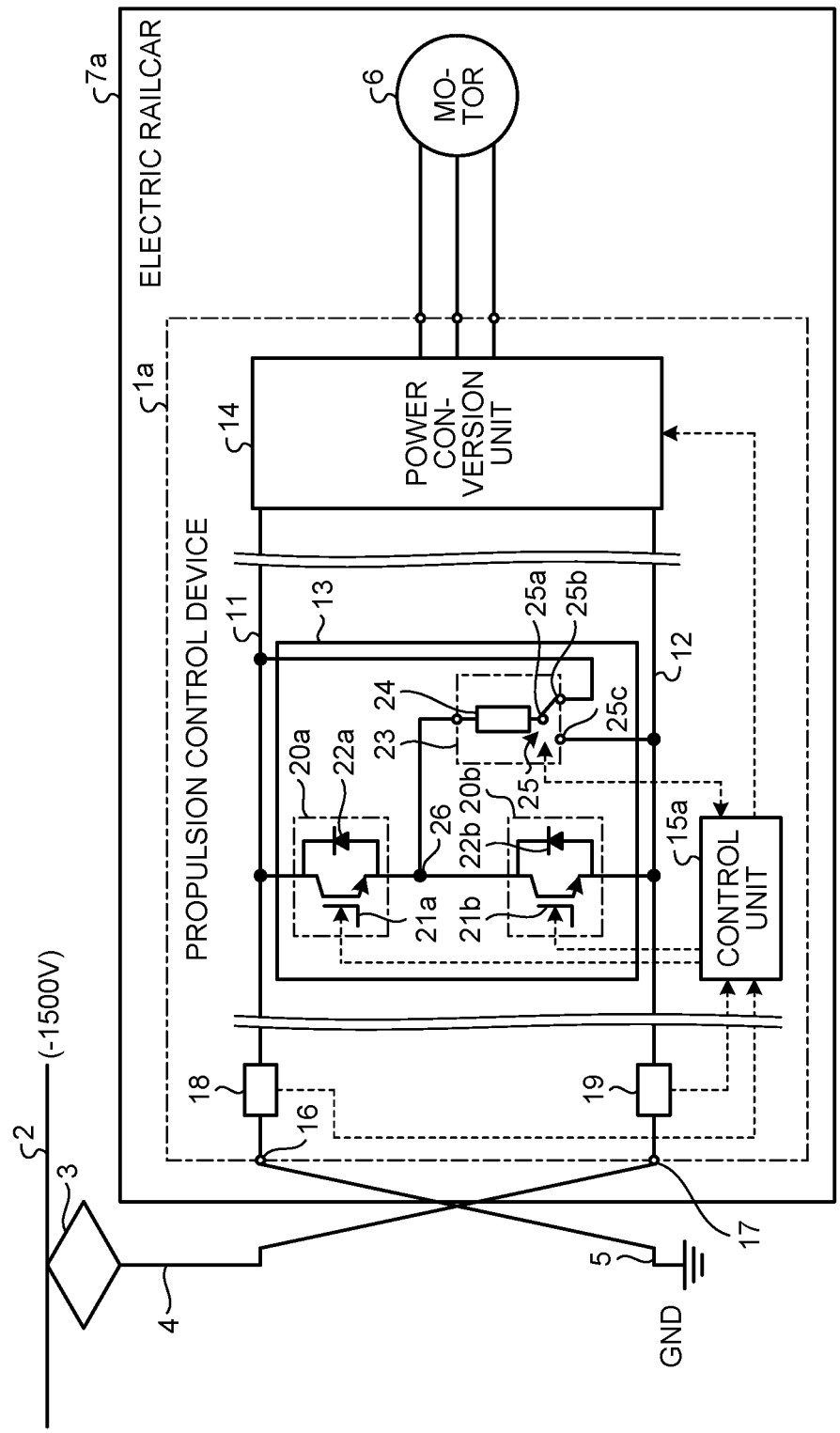
FIG. 9 is a diagram illustrating an example configuration of the propulsion control device according to the second embodiment and example connections in a case where the propulsion control device is connected to the overhead contact line that supplies direct-current power at a negative-polarity voltage.

FIG. 8 is a diagram illustrating an example configuration of a propulsion control device 1*a* according to the second embodiment and example connections in a case where the propulsion control device 1*a* is connected to the overhead contact line 2 that supplies direct-current power at a positive-polarity voltage. FIG. 9 is a diagram illustrating an example configuration of the propulsion control device 1*a* according to the second embodiment and example connections in a case where the propulsion control device 1*a* is connected to the overhead contact line 2 that supplies direct-current power at a negative-polarity voltage. The propulsion control device 1*a* is a device that is installed on an electric railcar 7*a* and controls the speed of the electric railcar 7*a*. The propulsion control device 1*a* is obtained by replacing the control unit 15 with a control unit 15*a* and adding a first sensor 18 and a second sensor 19 with respect to the propulsion control device 1 illustrated in FIG. 1.

As described above, the first wire 11 is connected to the power line 4 or the ground line 5 via the terminal 16, but depending on a line to be connected, a potential difference between a potential applied to the first wire 11 and a potential applied to the second wire 12 is reversed, and a direction of a current flowing through the first wire 11 is reversed. Therefore, the first sensor 18 detects at least one of the potential applied to the first wire 11 and the current flowing through the first wire 11. The first sensor 18 outputs a result of the detection to the control unit 15*a* as a first detection result.

Similarly, as described above, the second wire 12 is connected to the power line 4 or the ground line 5 via the terminal 17, but depending on a line to be connected, a potential difference between a potential applied to the second wire 12 and a potential applied to the first wire 11 is reversed, and a direction of a current flowing through the second wire 12 is reversed. Therefore, the second sensor 19 detects at least one of the potential applied to the second wire 12 and the current flowing through the second wire 12. The second sensor 19 outputs a result of the detection to the control unit 15*a* as a second detection result.

In a case where the polarity of the voltage of the direct-current power supplied from the overhead contact line 2 is positive, the power line 4 is connected to the first wire 11, and the ground line 5 is connected to the second wire 12, a potential detected by the first sensor 18 is higher than a potential detected by the second sensor 19. The potential detected by the second sensor 19 is a reference potential. In addition, a direction of a current detected by the first sensor 18 is a direction from the outside to the inside of the propulsion control device 1*a*, and a direction of a current detected by the second sensor 19 is a direction from the inside to the outside of the propulsion control device 1*a*. On the other hand, in a case where the polarity of the voltage of the direct-current power supplied from the overhead contact line 2 is positive, the ground line 5 is connected to the first wire 11, and the power line 4 is connected to the second wire 12, a potential detected by the second sensor 19 is higher than a potential detected by the first sensor 18. The potential detected by the first sensor 18 is a reference potential. In addition, a direction of a current detected by the second sensor 19 is a direction from the outside to the inside of the propulsion control device 1*a*, and a direction of a current detected by the first sensor 18 is a direction from the inside to the outside of the propulsion control device 1*a*.

In a case where the polarity of the voltage of the direct-current power supplied from the overhead contact line 2 is negative, the ground line 5 is connected to the first wire 11, and the power line 4 is connected to the second wire 12, a potential detected by the first sensor 18 is higher than a potential detected by the second sensor 19. The potential detected by the first sensor 18 is a reference potential. In addition, a direction of a current detected by the first sensor 18 is a direction from the outside to the inside of the propulsion control device 1*a*, and a direction of a current detected by the second sensor 19 is a direction from the inside to the outside of the propulsion control device 1*a*. On the other hand, in a case where the polarity of the voltage of the direct-current power supplied from the overhead contact line 2 is negative, the power line 4 is connected to the first wire 11, and the ground line 5 is connected to the second wire 12, a potential detected by the second sensor 19 is higher than a potential detected by the first sensor 18. The potential detected by the second sensor 19 is a reference potential. In addition, a direction of a current detected by the second sensor 19 is a direction from the outside to the inside of the propulsion control device 1*a*, and a direction of a current detected by the first sensor 18 is a direction from the inside to the outside of the propulsion control device 1*a*.

The control unit 15*a* has the function of the control unit 15 in the first embodiment described above, and further has a function of determining whether each of the connection destinations of the first wire 11, the second wire 12, and the switch 25 is appropriate. That is, the control unit 15*a* acquires a first detection result from the first sensor 18 and acquires a second detection result from the second sensor 19. The control unit 15*a* determines the polarity of the voltage of the direct-current power supplied from the overhead contact line 2 on the basis of the first detection result and the second detection result. Next, the control unit 15*a* determines whether the connection destinations of the first wire 11 and the second wire 12 are appropriate for the polarity of the voltage of the direct-current power supplied from the overhead contact line 2. Specifically, in the case where the polarity of the voltage of the direct-current power supplied from the overhead contact line 2 is positive, the control unit 15*a* determines that the connection destinations are appropriate when the power line 4 is connected to the first wire 11 and the ground line 5 is connected to the second wire 12. In addition, in the case where the polarity of the voltage of the direct-current power supplied from the overhead contact line 2 is negative, the control unit 15*a* determines that the connection destinations are appropriate when the ground line 5 is connected to the first wire 11 and the power line 4 is connected to the second wire 12.

The control unit 15*a* determines whether the connection destination of the first terminal 25*a* of the switch 25 is a specified terminal on the basis of the first detection result and the second detection result. That is, the control unit 15*a* monitors a connection state of the switch 25 and determines whether the connection destination of the first terminal 25*a* of the switch 25 is appropriate for the polarity of the voltage of the direct-current power supplied from the overhead contact line 2. Specifically, in the case where the polarity of the voltage of the direct-current power supplied from the overhead contact line 2 is positive, the control unit 15*a* determines that the connection destination is appropriate when the first terminal 25*a* of the switch 25 is connected to the third terminal 25*c*. In addition, in the case where the polarity of the voltage of the direct-current power supplied from the overhead contact line 2 is negative, the control unit 15*a* determines that the connection destination is appropriate when the first terminal 25*a* of the switch 25 is connected to the second terminal 25*b*.

If it is determined that at least one of the connection destination of the first wire 11, the connection destination of the second wire 12, and the connection destination of the first terminal 25*a* of the switch 25 is not appropriate, the control unit 15*a* outputs a warning indicating that there is an anomaly in connection to at least one of a cab (not illustrated) of the electric railcar 7*a* and a ground device (not illustrated) that manages the operation of the electric railcar 7*a*. If it is determined that all of the connection destination of the first wire 11, the connection destination of the second wire 12, and the connection destination of the first terminal 25*a* of the switch 25 are appropriate, the control unit 15*a* may output information indicating that the connection is appropriate to at least one of the cab and the ground device described above.

Figure 10:
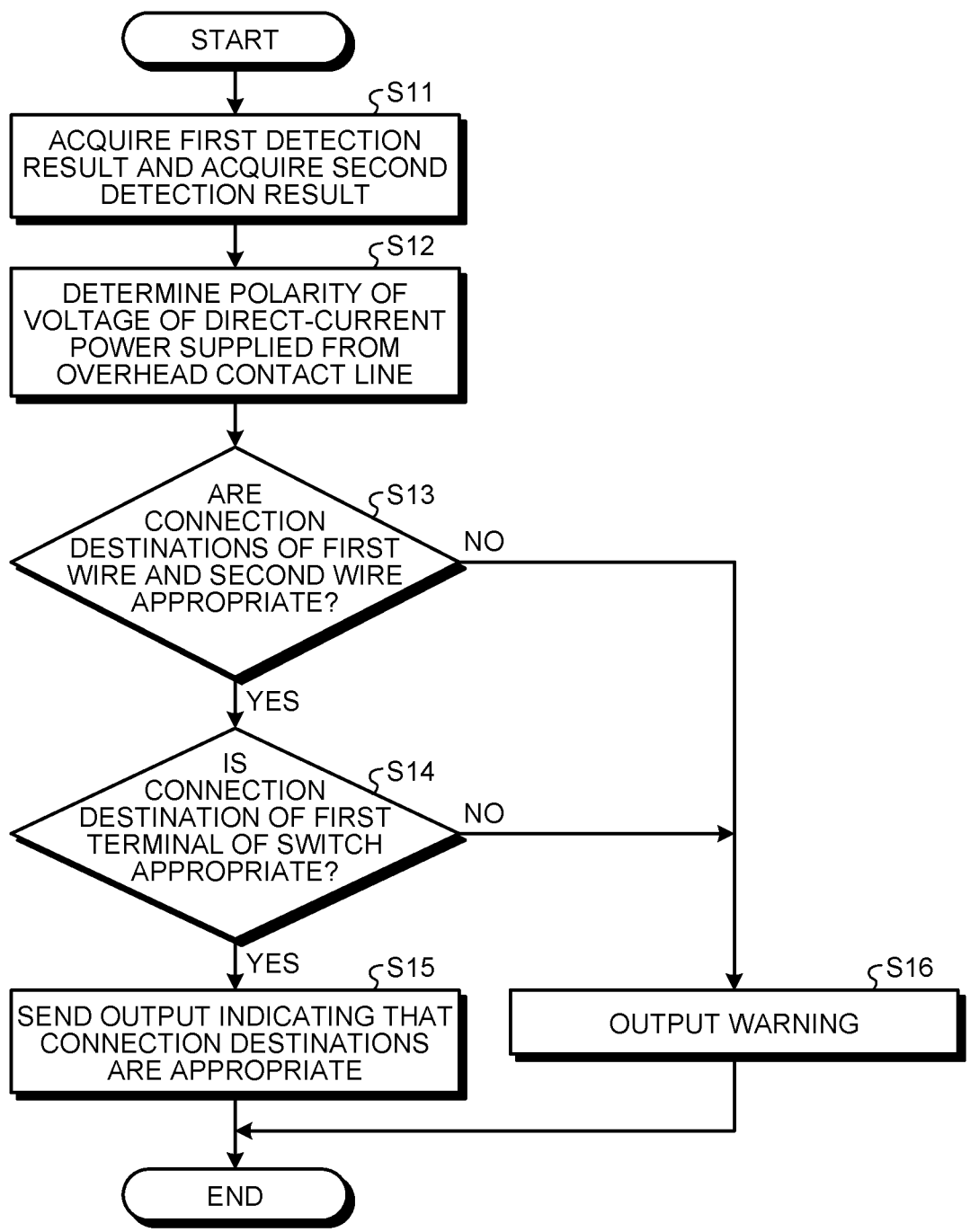
FIG. 10 is a flowchart illustrating an operation of a control unit included in the propulsion control device according to the second embodiment.

An operation of the control unit 15*a* will be described with reference to a flowchart. FIG. 10 is a flowchart illustrating the operation of the control unit 15*a* included in the propulsion control device 1*a* according to the second embodiment. The control unit 15*a* acquires a first detection result from the first sensor 18 and acquires a second detection result from the second sensor 19 (step S11). The control unit 15*a* determines the polarity of the voltage of the direct-current power supplied from the overhead contact line 2 on the basis of the first detection result and the second detection result (step S12). The control unit 15*a* determines whether the connection destinations of the first wire 11 and the second wire 12 are appropriate for the polarity of the voltage of the direct-current power supplied from the overhead contact line 2 (step S13). If it is determined that the connection destinations of the first wire 11 and the second wire 12 are appropriate (step S13: Yes), the control unit 15*a* determines whether the connection destination of the first terminal 25*a* at the switch 25 is appropriate for the polarity of the voltage of the direct-current power supplied from the overhead contact line 2 (step S14).

If it is determined that the connection destination of the first terminal 25*a* at the switch 25 is appropriate (step S14: Yes), the control unit 15*a* outputs information indicating that the connection destinations are appropriate (step S15). In the case of Step S14: Yes, the control unit 15*a* may skip step S15 and end the operation. If it is determined that the connection destinations of the first wire 11 and the second wire 12 are not appropriate (step S13: No), or that the connection destination of the first terminal 25*a* at the switch 25 is not appropriate (step S14: No), the control unit 15*a* outputs a warning (step S16).

The contents of the control of the first switching element 21*a* and the second switching element 21*b* by the control unit 15*a* are similar to the contents of the control by the control unit 15 described above.

Next, a hardware configuration of the propulsion control device 1*a* will be described. In the propulsion control device 1*a*, the first sensor 18 and the second sensor 19 are sensors capable of detecting at least one of a potential and a current. The control unit 15*a* is realized by processing circuitry similarly to the control unit 15 described above. The processing circuitry may be a processor that executes a program stored in a memory and the memory, or may be dedicated hardware.

As described above, according to the present embodiment, the propulsion control device 1*a* includes the first sensor 18 at a subsequent stage of the terminal 16 of the first wire 11 to which the power line 4 or the ground line 5 is connected, and includes the second sensor 19 at a subsequent stage of the terminal 17 of the second wire 12 to which the power line 4 or the ground line 5 is connected. On the basis of the first detection result of the first sensor 18 and the second detection result of the second sensor 19, the propulsion control device 1a determines the polarity of the voltage of the direct-current power supplied from the overhead contact line 2, and determines whether the connection destination of the power line 4, the connection destination of the ground line 5, and the connection destination of the first terminal 25a of the switch 25 are appropriate for the polarity of the voltage of the direct-current power supplied from the overhead contact line 2. As a result, the propulsion control device 1a can obtain an effect similar to that of the first embodiment, and can detect erroneous connection of the power line 4, the ground line 5, and the first terminal 25a of the switch 25.

Third Embodiment

In the second embodiment, on the basis of the first detection result of the first sensor 18 and the second detection result of the second sensor 19, the control unit 15a of the propulsion control device 1a determines whether the connection destinations of the first wire 11 and the second wire 12 are appropriate, and determines whether the connection destination of the first terminal 25a of the switch 25 is appropriate. In a third embodiment, the control unit 15a controls the connection destination of the first terminal 25a of the switch 25 on the basis of the polarity of the voltage of the direct-current power supplied from the overhead contact line 2.

In the third embodiment, a configuration of the propulsion control device 1a is similar to the configuration thereof in the second embodiment illustrated in FIGS. 8 and 9. In the propulsion control device 1a, the control unit 15a sets the connection destination of the first terminal 25a of the switch 25 to the second terminal 25b or the third terminal 25c on the basis of the first detection result and the second detection result. That is, the control unit 15a sets the connection destination of the first terminal 25a of the switch 25 to the second terminal 25b or the third terminal 25c on the basis of the polarity of the voltage of the direct-current power supplied from the overhead contact line 2. Specifically, in the case where the polarity of the voltage of the direct-current power supplied from the overhead contact line 2 is positive, the control unit 15a connects the first terminal 25a of the switch 25 to the third terminal 25c. In addition, in the case where the polarity of the voltage of the direct-current power supplied from the overhead contact line 2 is negative, the control unit 15a connects the first terminal 25a of the switch 25 to the second terminal 25b.

Figure 11:
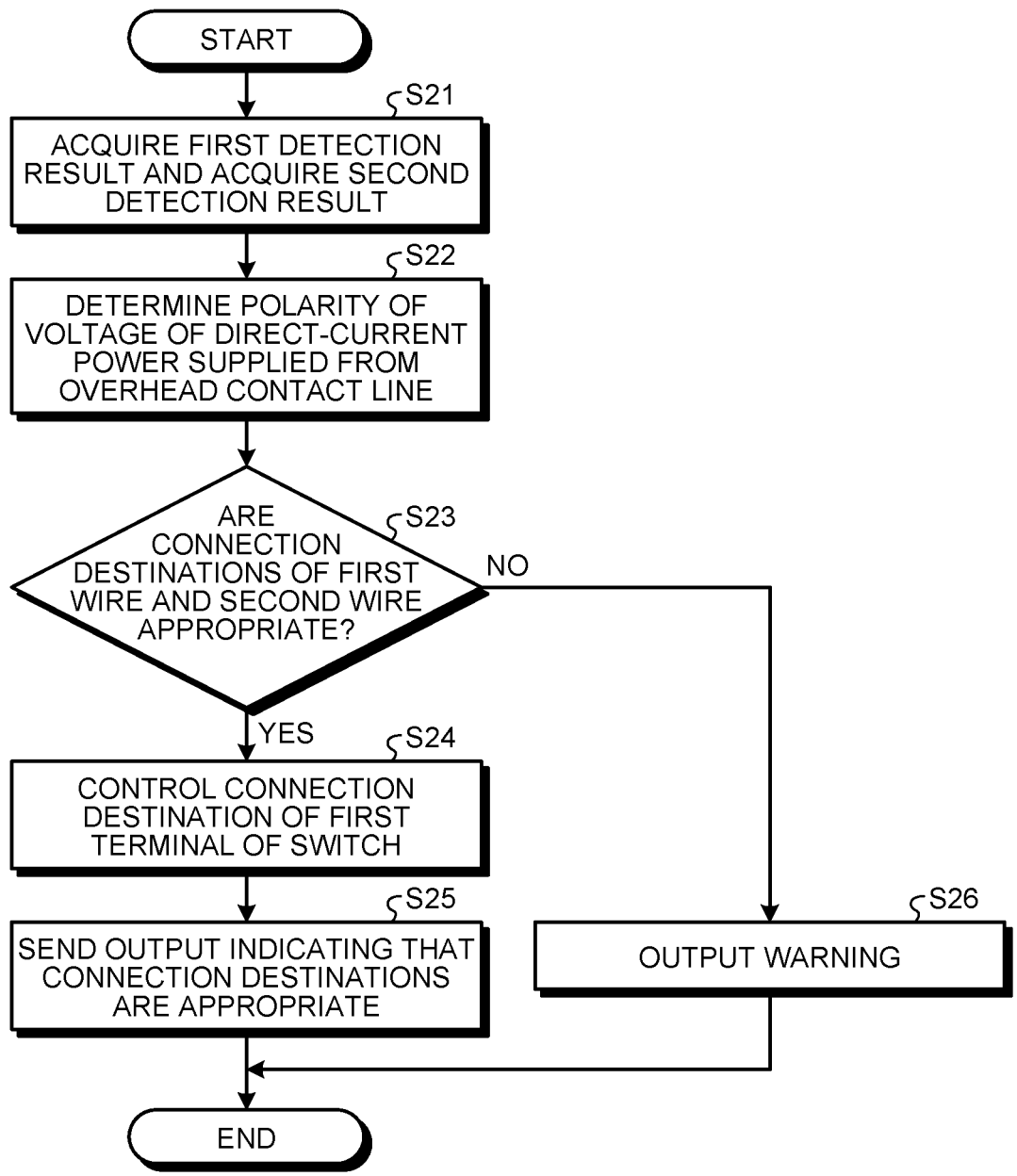
FIG. 11 is a flowchart illustrating an operation of the control unit included in the propulsion control device according to a third embodiment.

An operation of the control unit 15a will be described with reference to a flowchart. FIG. 11 is a flowchart illustrating the operation of the control unit 15a included in the propulsion control device 1a according to the third embodiment. In the flowchart illustrated in FIG. 11, the operation contents of steps S21 to S23 and steps S25 to S26 are similar to the operation contents of steps S11 to S13 and steps S15 to S16 of the flowchart of the second embodiment illustrated in FIG. 10. If it is determined that the connection destinations of the first wire 11 and the second wire 12 are appropriate (step S23: Yes), the control unit 15a controls the connection destination of the first terminal 25a of the switch 25 on the basis of the polarity of the voltage of the direct-current power supplied from the overhead contact line 2 (step S24). As described above, the control unit 15a connects the first terminal 25a of the switch 25 to the third terminal 25c in the case where the polarity of the voltage of the direct-current power supplied from the overhead contact line 2 is positive, and connects the first terminal 25a of the switch 25 to the second terminal 25b in the case where the polarity of the voltage of the direct-current power supplied from the overhead contact line 2 is negative.

As described above, according to the present embodiment, the propulsion control device 1a includes the first sensor 18 at a subsequent stage of the terminal 16 of the first wire 11 to which the power line 4 or the ground line 5 is connected, and includes the second sensor 19 at a subsequent stage of the terminal 17 of the second wire 12 to which the power line 4 or the ground line 5 is connected. The propulsion control device 1a determines the polarity of the voltage of the direct-current power supplied from the overhead contact line 2 on the basis of the first detection result of the first sensor 18 and the second detection result of the second sensor 19, and controls the connection destination of the first terminal 25a of the switch 25 on the basis of the polarity of the voltage of the direct-current power supplied from the overhead contact line 2. As a result, the propulsion control device 1a can obtain an effect similar to that of the first embodiment, and can detect erroneous connection of the power line 4 and the ground line 5. Furthermore, the propulsion control device 1a can prevent erroneous connection of the first terminal 25a of the switch 25 by automatically controlling the connection destination of the first terminal 25a of the switch 25.

The configurations described in the embodiments above are merely examples of the content of the present invention and can be combined with other known technology and part thereof can be omitted or modified without departing from the gist of the present invention.

REFERENCE SIGNS LIST 1, 1a propulsion control device; 2 overhead contact line; 3 pantograph; 4 power line; 5 ground line; 6 motor; 7, 7a electric railcar; 11 first wire; 12 second wire; 13 brake chopper circuit; 14 power conversion unit; 15, 15a control unit; 16, 17 terminal; 18 first sensor; 19 second sensor; 20a first switching module; 20b second switching module; 21a first switching element; 21b second switching element; 22a first diode; 22b second diode; 23 brake resistor module; 24 brake resistor; 25, 27, 28 switch; 25a first terminal; 25b second terminal; 25c third terminal; 26 connection point.

The invention claimed is:

1. A propulsion control device comprising:
a first wire that, in a case where direct-current power at a positive-polarity voltage is supplied from a power supply line, is connected to a power line to which direct-current power is supplied from the power supply line and that, in a case where direct-current power at a negative-polarity voltage is supplied from the power supply line, is connected to a ground line connected to a reference potential;
a second wire that, in a case where direct-current power at a negative-polarity voltage is supplied from the power supply line, is connected to the power line and that, in a case where direct-current power at a positive-polarity voltage is supplied from the power supply line, is connected to the ground line; and
a brake chopper circuit in which a first switching element to which a first diode that is a freewheeling diode is connected in parallel and a second switching element to which a second diode that is a freewheeling diode is connected in parallel are connected in series, wherein in the brake chopper circuit, one end of the first switching element is connected to the first wire, another end of the first switching element is connected to one end of the second switching element at a connection point, another end of the second switching element is connected to the second wire, the connection point is connected to the second wire via a brake resistor in a case where direct-current power at a positive-polarity voltage is supplied from the power supply line, and the connection point is connected to the first wire via the brake resistor in a case where direct-current power at a negative-polarity voltage is supplied from the power supply line.

2. The propulsion control device according to claim 1, wherein the brake chopper circuit includes the brake resistor and a switch capable of changing a connection destination of the brake resistor, in the brake chopper circuit, one end of the brake resistor is connected to the connection point, another end of the brake resistor is connected to a first terminal of the switch, a second terminal of the switch is connected to the first wire, and a third terminal of the switch is connected to the second wire, and the switch sets a connection destination of the first terminal to the second terminal or the third terminal.

3. The propulsion control device according to claim 2, wherein in a case where a polarity of the direct-current power is positive, the power line is connected to the first wire, the ground line is connected to the second wire, and the first terminal and the third terminal are connected at the switch, and in a case where the polarity of the direct-current power is negative, the ground line is connected to the first wire, the power line is connected to the second wire, and the first terminal and the second terminal are connected at the switch.

4. The propulsion control device according to claim 2, wherein the brake resistor is a variable resistor whose resistance value is variable.

5. The propulsion control device according to claim 2, comprising:

a first sensor to detect at least one of a potential applied to the first wire and a current flowing through the first wire, and to output a first detection result;

a second sensor to detect at least one of a potential applied to the second wire and a current flowing through the second wire, and to output a second detection result; and control circuitry to determine whether a connection destination of the first terminal of the switch is a specified terminal on a basis of the first detection result and the second detection result, and to control turning on and turning off of the first switching element and the second switching element.

6. The propulsion control device according to claim 2, comprising:

a first sensor to detect at least one of a potential applied to the first wire and a current flowing through the first wire, and to output a first detection result;

a second sensor to detect at least one of a potential applied to the second wire and a current flowing through the second wire, and to output a second detection result; and control circuitry to set a connection destination of the first terminal of the switch to the second terminal or the third terminal on a basis of the first detection result and the second detection result, and to control turning on and turning off of the first switching element and the second switching element.

7. The propulsion control device according to claim 5, wherein the control circuitry makes the second switching element normally off and controls turning on and turning off of the first switching element in a case where the power line is connected to the first wire and the ground line is connected to the second wire, and makes the first switching element normally off and controls turning on and turning off of the second switching element in a case where the ground line is connected to the first wire and the power line is connected to the second wire.

8. A propulsion control method performed by the propulsion control device according to claim 2, the propulsion control device including control circuitry to control turning on and turning off of the first switching element and the second switching element, the method comprising:

a first acquisition of acquiring a first detection result from a first sensor that detects at least one of a potential applied to the first wire and a current flowing through the first wire;

a second acquisition of acquiring a second detection result from a second sensor that detects at least one of a potential applied to the second wire and a current flowing through the second wire; and a determination of determining whether a connection destination of the first terminal of the switch is a specified terminal on a basis of the first detection result and the second detection result.

9. A propulsion control method performed by the propulsion control device according to claim 2, the propulsion control device including control circuitry to control turning on and turning off of the first switching element and the second switching element, the method comprising:

a first acquisition of acquiring a first detection result from a first sensor that detects at least one of a potential applied to the first wire and a current flowing through the first wire;

a second acquisition of acquiring a second detection result from a second sensor that detects at least one of a potential applied to the second wire and a current flowing through the second wire; and a control of setting a connection destination of the first terminal of the switch to the second terminal or the third terminal on a basis of the first detection result and the second detection result.

10. The propulsion control method according to claim 8, comprising:

a control of making the second switching element normally off and controlling turning on and turning off of the first switching element in a case where the power line is connected to the first wire and the ground line is connected to the second wire, and making the first switching element normally off and controlling turning on and turning off of the second switching element in a case where the ground line is connected to the first wire and the power line is connected to the second wire.

11. The propulsion control device according to claim 6, wherein
the control circuitry makes the second switching element normally off and controls turning on and turning off of the first switching element in a case where the power line is connected to the first wire and the ground line is connected to the second wire, and makes the first switching element normally off and controls turning on and turning off of the second switching element in a case where the ground line is connected to the first wire and the power line is connected to the second wire.

12. The propulsion control method according to claim 9, comprising:
a control of making the second switching element normally off and controlling turning on and turning off of the first switching element in a case where the power line is connected to the first wire and the ground line is connected to the second wire, and making the first switching element normally off and controlling turning on and turning off of the second switching element in a case where the ground line is connected to the first wire and the power line is connected to the second wire.

* * * * *